A. PITCHER.
Hog and Sheep Catcher.

No. 208,845.                    Patented Oct. 8, 1878.

Witnesses:
Edward Rose
R. D. Pitcher

Inventor:
Adam Pitcher

UNITED STATES PATENT OFFICE.

ADAM PITCHER, OF NORTHVILLE, ILLINOIS.

IMPROVEMENT IN HOG AND SHEEP CATCHERS.

Specification forming part of Letters Patent No. 208,845, dated October 8, 1878; application filed June 6, 1878.

*To all whom it may concern:*

Be it known that I, ADAM PITCHER, of Northville, in the county of La Salle and State of Illinois, have invented a new and useful Improvement in Hog and Sheep Catchers, which improvement is fully set forth in the following specification, reference being had to the accompanying drawings.

The object of my invention is to enable a farmer, or a hog, sheep, or cattle raiser, to catch such of the animals in his flock or drove as he may have singled out for a certain purpose by means of an automatic clamp, which is hung on the end of a stick and touched to the animal's leg from behind, when the clamp will suddenly close, and will remain closed by means of ratchet and pawl until the operator desires to release the animal again.

Some hog and sheep catchers have heretofore been made and used; but in those there is no provision made for holding them closed automatically, nor are they as easily and certainly operated as mine.

Figure 1:
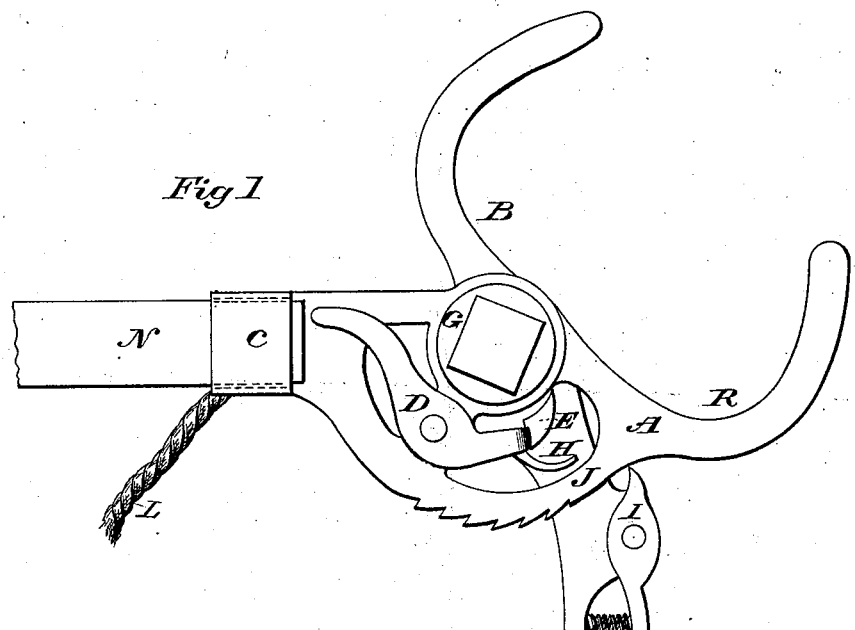
Figure 2:
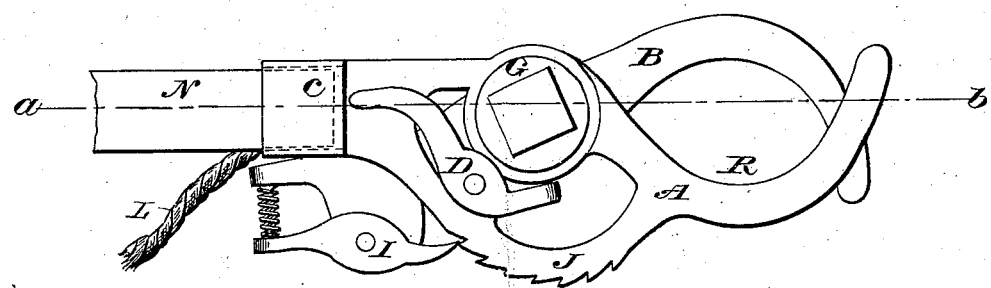
Figure 3:
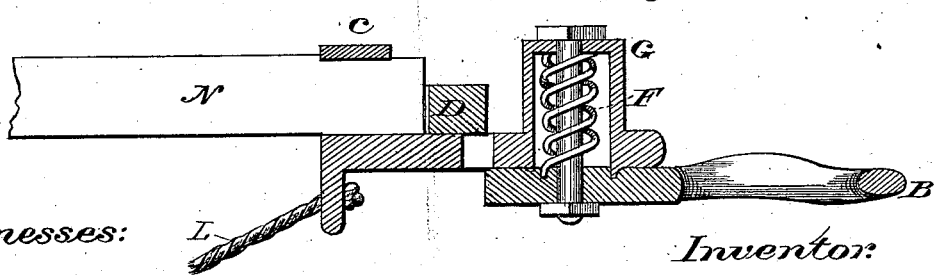

The implement is illustrated more in detail in Figure 1, which shows the catcher open when set ready to catch an animal. Fig. 2 shows the catcher as closed; and Fig. 3 is a vertical section through *a b*, Fig. 2.

The apparatus is composed, chiefly, of two limbs, A and B, which cross each other, and are hinged at the middle in the manner of a pair of shears. The upper limb, A, has a square socket, C, into which is inserted a pole, N, of the desired length, to enable a person to reach a shy animal so as to strike its leg with the apparatus in such a manner as to hit with the inner side of the curve at R. It is necessary that the stick or pole N should be loose in the socket C, so as to have a certain motion sidewise when the animal's leg is touched, which motion liberates the catch D from off the projection E, when the catcher will snap shut by the force of the spring F in the hub G. The catch D is brought back into position against the projection E during the process of reopening the catcher by means of a curved guide, H.

The lower limb, B, carries a pawl, I, which engages in the ratchet J, being held in by the spring K, so that the catcher cannot be opened again unless the pawl I is first released. A rope, L, attached to the lower limb, B, enables a person to lead an animal just the same as if the rope was tied to its leg.

I claim as my invention—

1. In animal-stocks having jaws A and B, operated by a spring to close them, the combination of the socket C and removable pole N with the holding and releasing catch D, constructed and operating substantially as set forth.

2. In animal-stocks, the combination, with the jaws or limbs A B, the latter having the curved guide H and carrying the spring-detent I, of the spring F, catch D, ratchet J, and removable pole N, and socket C, substantially as set forth.

ADAM PITCHER.

Witnesses:
 EDWARD ROSE,
 R. D. PITCHER.